(12) United States Patent
Kolodziej et al.

(10) Patent No.: US 7,087,335 B2
(45) Date of Patent: Aug. 8, 2006

(54) H-INFINITY CONTROL WITH INTEGRATOR COMPENSATION FOR ANODE PRESSURE CONTROL IN A FUEL CELL STACK

(75) Inventors: Jason R Kolodziej, West Henrietta, NY (US); John S Wheat, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 473 days.

(21) Appl. No.: 10/341,083

(22) Filed: Jan. 13, 2003

(65) Prior Publication Data

US 2004/0137294 A1    Jul. 15, 2004

(51) Int. Cl.
*H01M 8/04* (2006.01)
*H01M 8/12* (2006.01)
*H01M 8/00* (2006.01)

(52) U.S. Cl. .......................... 429/25; 429/12; 429/13; 429/22

(58) Field of Classification Search ...................... None
See application file for complete search history.

(56) References Cited

U.S. PATENT DOCUMENTS

| | | | | |
|---|---|---|---|---|
| 5,290,641 | A | * | 3/1994 | Harashima .................. 429/17 |
| H001410 | H | * | 1/1995 | Hartley ....................... 700/28 |
| 5,859,774 | A | * | 1/1999 | Kuzuya et al. ............. 700/71 |
| 6,250,419 | B1 | | 6/2001 | Chabaan et al. |

OTHER PUBLICATIONS

Kemin Zhou with John C. Doyle, Essentials of Robust Control, 1998, pp. xv-xvi, 9, 50-63, 85-94, 129-147, 233-246, 269-282, 306-307.

Jer-Nan Juang, NASA Langley Research Center, Applied System Identification, 1994, pp. 31-32, 206-210, 214-217 and 275-326.

Wensheng He and Trung Van Nguyen, A New Diagnostic Tool for Liquid Water Management in PEM Fuel Cells Using Interdigitated Flow Fields.

Goichi Matsui, Identification of Flow Regimes in Vertical Gas-Liquid Two-Phase Flow using Differential Pressure Fluctuations, Int. J. Multiphase Flow vol. 10, No. 6, pp. 711-719, 1984.

(Continued)

*Primary Examiner*—Patrick Joseph Ryan
*Assistant Examiner*—Julian Mercado
(74) *Attorney, Agent, or Firm*—Harness, Dickey & Pierce, P.L.C.

(57) ABSTRACT

Pressure control in a fuel cell is achieved by using an H-infinity controller coupled in a feedback loop between a reactant feed gas valve and a pressure sensor on gas flows to the membrane electrode assembly of the fuel cell. To maintain pressure balance across the membrane, the pressure of the oxidant reactant is used to regulate fuel reactant flow. An integrator windup compensator manages integral windup in the H-infinity control scheme. Control weight, sensor noise weight, and performance weight matrices are incorporated into the H-infinity control model. Respective to PID control, the H-infinity model provides superior performance in the presence of high frequency feedback noise enabling use of low cost control components in the fuel cell and a minimum of EMI shielding.

28 Claims, 12 Drawing Sheets

OTHER PUBLICATIONS

M.W. Wambsganss, J.A. Jendrzejckzyk and D.M. France, Two-Phase Flow Patterns and Transitions In a Small, Horizontal, Rectangular Channel, Int. J. Multiphase Flow vol. 17, No. 3, pp. 327-342, 1991.

D.J. Wheeler, J.S. Yi, R. Fredley, D. Yang, T. Patterson Jr., and L. VanDine, Advancements in Fuel Cell Stack Technology at International Fuel Cells, Journal of New Materials for Materials for Electrochemical Systems 4, 233-238 (2001).

* cited by examiner $$\begin{bmatrix} \dot{x}_p \\ \dot{x}_e \\ \dot{x}_u \\ \dot{x}_n \\ y_\alpha \\ y_\beta \\ y_e \\ y_u \\ e \end{bmatrix} = \begin{bmatrix} -\bar{\alpha} & 0 & 0 & 0 & 0 & -1 & 0 & 0 & 0 & 0 & 1 \\ B_e\bar{\beta} & A_e & 0 & -B_eC_n & 0 & 0 & -B_e & B_e & -B_eD_n & 0 \\ 0 & 0 & A_u & 0 & 0 & 0 & -B_e100 & 0 & 0 & B_u \\ 0 & 0 & 0 & A_n & 0 & 0 & 0 & 0 & B_n & 0 \\ \hat{\alpha} & 0 & 0 & 0 & 0 & 0 & 0 & 0 & 0 & 0 \\ \hat{\beta} & 0 & 0 & 0 & 0 & 0 & 0 & 0 & 0 & 0 \\ -D_e\bar{\beta} & C_e & 0 & -D_eC_n & 0 & 0 & D_e & -D_e100 & D_e & -D_eD_n & D_u \\ 0 & 0 & C_u & 0 & 0 & 0 & 0 & 0 & 0 & 0 \\ -\bar{\beta} & 0 & 0 & -C_n & 0 & 0 & -1 & -1 & -100 & 1 & -D_n & 0 \end{bmatrix} \begin{bmatrix} x_p \\ x_e \\ x_u \\ x_n \\ u_\alpha \\ u_\beta \\ 1 \\ r \\ n \\ u \end{bmatrix}$$

*Figure 11*

H-INFINITY CONTROL WITH INTEGRATOR COMPENSATION FOR ANODE PRESSURE CONTROL IN A FUEL CELL STACK

FIELD OF THE INVENTION

The present invention relates to fuel cell power systems and methods for controlling pressure in a reactant feed gas stream to a fuel cell stack of the fuel cell power system.

BACKGROUND OF THE INVENTION

Fuel cell power systems convert a fuel and an oxidant to electricity. One fuel cell power system type of keen interest employs use of a proton exchange membrane (hereinafter "PEM") to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

In a typical fuel cell assembly (stack) within a fuel cell power system, individual fuel cells have flow fields with inlets to fluid manifolds; these collectively provide channels for the various reactant gases and cooling fluids in the stack to flow into each cell. Gas diffusion assemblies then provide a final fluid distribution to further disperse reactant fluids from the flow field space to the reactive anode and cathode; these diffusion sections are frequently advantageously embedded as a part of the design of collector electrodes pressing against the reactive anode and cathode.

Effective operation of a PEM requires maintenance of a small pressure drop between the cathode (air) and anode (hydrogen) gases across the PEM; in this regard, accurate pressure control is vital to fuel cell stack performance and durability.

Control of fuel cell power systems must also resolve high frequency noise derived from EMI (electromagnetic interference); sources of EMI are both internal from the components of the fuel cell as well as external, especially when the fuel cell powers a vehicle which moves from place to place and thereby experiences different EMI environments.

There is an ongoing desire to minimize cost in fuel cell systems. Low cost components (such as pressure and feed control valves), however, frequently demonstrate susceptibility to EMI and also provide marginal acceptability in maintaining acceptably balanced pressures in fuel cell stacks when used with traditional PID (proportional-integral-derivative) control schemes. Components (such as pressure and feed control valves) which demonstrate good resistance to EMI and also provide acceptability in maintaining balanced pressures in fuel cell stacks when used with traditional PID (proportional-integral-derivative) control schemes are not favored for deployment because of higher cost.

What is needed is an approach to fuel cell pressure control which provides acceptable precision in balancing pressures across a PEM at low cost. The present invention is directed to fulfilling this need.

SUMMARY OF THE INVENTION

The present invention provides pressure control in a fuel cell having at least one membrane electrode assembly in reactive interface (a) to a plurality of oxidant reactant flow channels carrying an oxidant reactant and (b) to a plurality of fuel reactant flow channels carrying a fuel reactant, using: a valve disposed to control at least one reactant flow to the membrane electrode assembly; a pressure sensor disposed to measure pressure within the fuel cell; and an H-infinity controller coupled in a feedback loop between the valve and the pressure sensor.

As a method, the invention operates a fuel cell having at least one membrane electrode assembly in reactive interface (a) to a plurality of oxidant reactant flow channels carrying an oxidant reactant and (b) to a plurality of fuel reactant flow channels carrying a fuel reactant by measuring pressure within the fuel cell; deriving a setpoint for at least one reactant flow from an H-infinity control model in response to pressure data from the measuring step; and regulating each reactant flow for which the deriving step derives a setpoint.

The invention further provides that the pressure of the oxidant reactant is used to regulate fuel reactant flow.

The invention also provides for use of an integrator windup compensator in data communication with the H-infinity controller and also for use of a real-time computer to execute the H-infinity controller and/or the windup compensator.

The invention further provides for incorporation of (a) a control weight matrix, (b) a sensor noise weight matrix, and/or (c) a performance weight matrix in the H-infinity control model.

When compared to a standard PID controller, the invention provides enhanced performance in the presence of high frequency feedback noise to provide an improved operation of the control valve, less part-to-part actuator variation, and reduced system retuning. The invention further enables use of low cost control components in the fuel cell and minimizes the amount of EMI shielding needed for effective power generation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11 provides detail in a state-space matrix of the linear fractional transformation form of the exemplary control problem reviewed in this specification.

DETAILED DESCRIPTION OF THE PREFERRED EMBODIMENT

Figure 1A:
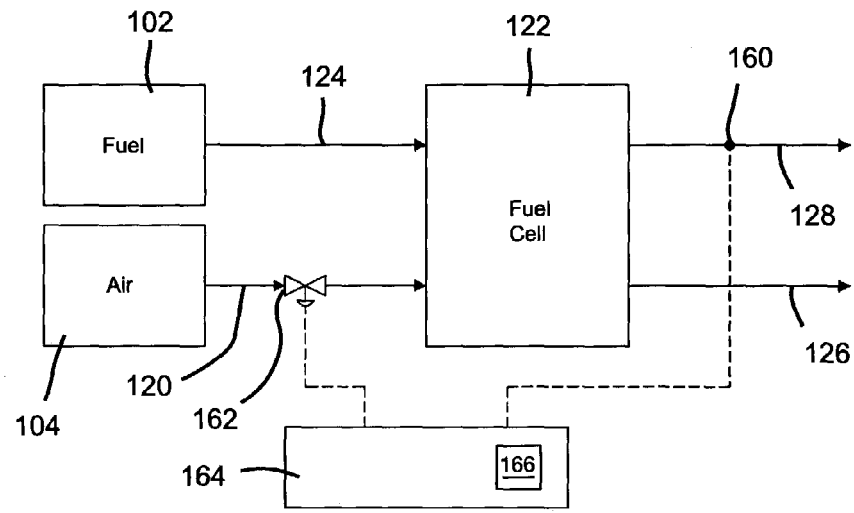
FIG. 1A presents a first embodiment of a fuel cell power system incorporating the present invention.

The following description of the preferred embodiment is merely exemplary in nature and is in no way intended to limit the invention, its application, or uses.

In utilizing a low cost proportional flow control valve to maintain a balanced pressure across a PEM, the anode pressure setpoint and/or fuel flow to the anode is determined from the cathode pressure against a user selected pressure set-point. In the past, standard PID control has been used for such control along with supporting feedforward loops and software filters. However, H-infinity (H$^\infty$) control of this application is shown herein to be well suited as a robust control approach. Details in the methodology of H-infinity control are established in the art and are appreciated from a study of "Essentials of Robust Control" by Kermin Zhou and John C. Doyle (Prentice Hall, 1998). The discussion of the preferred embodiments also references two additional concepts as further detailed in the following two paragraphs.

The discussion of the preferred embodiments references the concept of "steady-state" operation. As used herein, "steady-state" operation or "steady state" is considered a situation where (1) a process is dynamically regular and uniform in its operation over a time interval, (2) momentum, mass, and energy entities flowing into the process are essentially equal to the momentum, mass, and energy entities flowing out of the process (excepting anticipated accumulations), and (3) accumulations of momentum, mass, and energy within the process are essentially not occurring unless they are explicitly expected and factored into the relevant dynamic model. Mathematical solutions of the balances with respect to the status of steady state operation need to also accommodate expected chemical reactions. Steady state operation of a system is an issue of importance to the present invention since certain of the modeling equations are based upon the presumption that real-time input data used in a specific instance of a control decision have a collective associated steady state relationship. A system in "steady state" therefore, has attributes of dynamic balance, stability, steadiness, and equilibrium.

The concept of real-time computer process control is also a useful term in understanding the preferred embodiment. As used herein, real-time computer processing is broadly considered as a method of computer processing in which an event causes a given reaction within an actual time limit and wherein computer actions are specifically controlled within the context of and by external conditions and actual times. As an associated clarification in the realm of process control, real-time computer controlled processing relates to the performance of associated process control logical, decision, and quantitative operations intrinsic to a process control decision program functioning as part of a controlled apparatus implementing a process (such as the fuel cell benefiting from the present invention) wherein the process control decision program is periodically executed with relatively high frequency—e.g., having a period of between 20 ms and 2 sec for highly tactical control, or on the order of 10 to 100,000 times the period of the associated tactical control decision frequency for "on line" real-time advanced control routines, simulators, and optimizers, without limitation. The larger period for advanced control routines, simulators, and optimizers is frequently necessary to accommodate the substantial computer calculations which must be performed within one decision cycle of the advanced control routine, simulator, or optimizer. With further regard to the time period during which the process control decision program is periodically executed, some operations are optionally performed on a multiple of the process control decision program execution period needed for computation time; this less frequent operation period is usually adopted for purposes related to tuning, sensitivity, and efficient resource utilization.

The invention is further understood with reference to a generic fuel cell power system. Therefore, before further describing the invention in detail, a general overview of the types of power systems within which the present invention operate is provided. Reference is made to hydrogen-containing as having relatively high hydrogen content. The invention is hereafter described in the context of a fuel cell fueled by an $H_2$-containing reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkaline, or other aliphatic or aromatic hydrocarbons.

A first preferred system 100a illustrated in FIG. 1A includes hydrogen source 102 such as a hydrogen storage tank and oxidant source 104 such as ambient air provided via a pump or compressor (not shown). Hydrogen source 102 directs $H_2$-containing feed stream 120 to the anode side of fuel cell 122. Oxidant source 104 directs $O_2$-containing feed stream 124 to the cathode side of fuel cell 122. Anode exhaust (or effluent) 126 is discharged from the anode side of fuel cell stack system 122. Cathode exhaust (or effluent) 128 is discharged from the cathode side of fuel cell stack system 122. Pressure of cathode exhaust 128 from the cathode side of fuel cell stack system 122 is measured by pressure sensor 160.

Figure 1B:
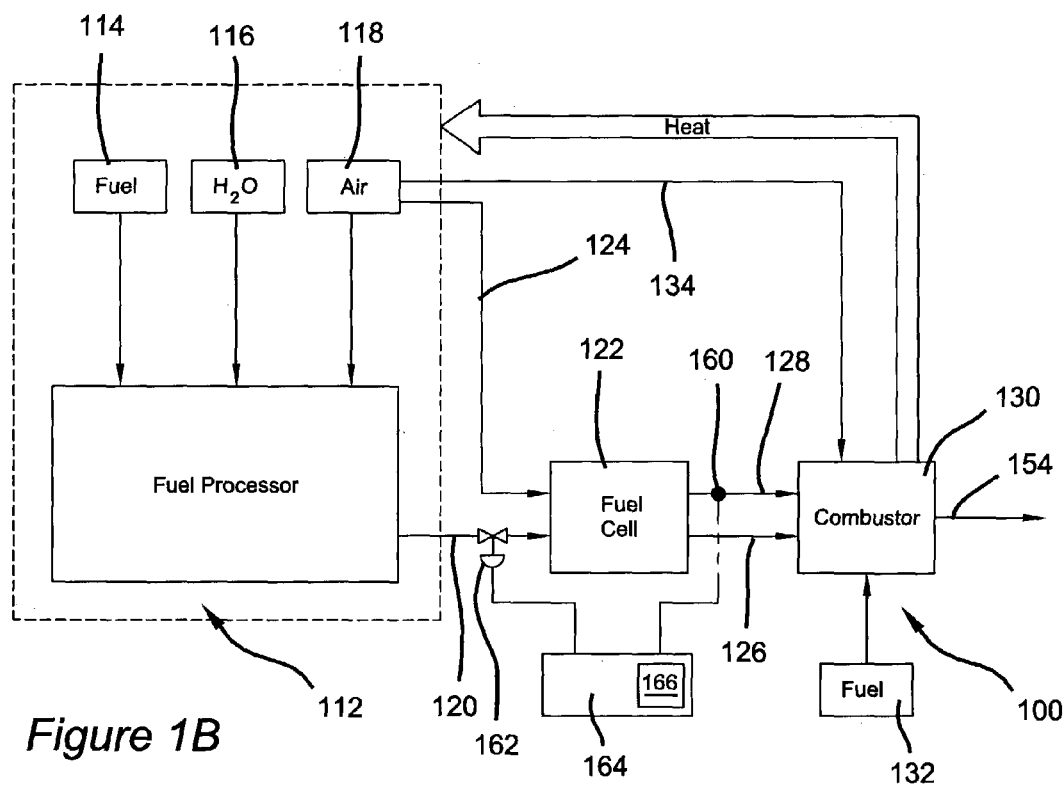
FIG. 1B presents a second embodiment of a fuel cell power system incorporating the present invention.

A second preferred system 100b illustrated in FIG. 1B includes a fuel processor 112 for catalytically reacting a reformable hydrocarbon fuel stream 114, and water in the form of steam from a water stream 116. In some fuel processors, air is also used in a combination partial oxidation/steam reforming reaction. In this case, fuel processor 112 also receives an air stream 118. The fuel processor 112 contains one or more reactors wherein the reformable hydrocarbon fuel in stream 114 undergoes dissociation in the presence of steam in stream 116 and air in stream 118 to produce the hydrogen-containing reformate exhausted from fuel processor 112 in reformate stream 120. Fuel processor 112 typically also includes one or more downstream reactors, such as water-gas shift (WGS) and/or preferential oxidizer (PrOx) reactors that are used to reduce the level of carbon monoxide in reformate stream 120 to acceptable levels, for example, below 20 ppm.

Anode exhaust (or effluent) 126 is discharged from the anode side of fuel cell stack system 122 and may contain some unreacted hydrogen. Cathode exhaust (or effluent) 128 is discharged from the cathode side of fuel cell stack system 122 and may contain some unreacted oxygen. Pressure of cathode exhaust 128 from the cathode side of fuel cell stack system 122 is measured by pressure sensor 160. These unreacted gases represent additional energy recovered in combustor 130, in the form of thermal energy, for various heat requirements within power system 100. Specifically, a hydrocarbon fuel 132 and/or anode effluent 126 are combusted, catalytically or thermally, in combustor 130 with oxygen provided to combustor 130 either from air in stream 134 or from cathode effluent stream 128, depending on power system 100 operating conditions. Combustor 130 discharges exhaust stream 154 to the environment, and the heat generated thereby is directed to fuel processor 112 as needed.

In both embodiments illustrated in FIGS. 1A and 1B, $H_2$-containing reformate 120 is fed through control valve 162 into the anode chamber of fuel cell stack system 122. Control valve 162 may be either an analog control valve or a solenoid spring return valve similar to a fuel injector valve with a 100 Hz duty cycle frequency. Concurrent with the feeding of $H_2$-containing reformate 120 through control valve 162 into the anode chamber of fuel cell stack system 122, oxygen in the form of air in stream 124 is fed into the cathode chamber of fuel cell stack system 122. The hydrogen from reformate stream 120 and the oxygen from oxidant stream 124 react in fuel cell stack system 122 to produce electricity.

Real-time computer 164 effects control of valve 162 in response to a signal from at least pressure sensor 160. That is to say the anode feed gas is controlled through use of real-time computer 164 with respect to the pressure of the cathode oxidant gas in fuel cell 122, although other parameters may also be utilized in the control of the anode feed gas. Controller logic 166 is provided for execution in real-time by computer 164. As presently preferred, controller logic 166 is also denoted as "software" and/or a "program" and/or an "executable program" within real-time computer 164 as a data schema holding data and/or formulae information and/or program execution instructions. Controller logic 166 is, in a preferred embodiment, machine code resident in the physical memory storage (i.e., without limitation, random access memory having "RAM" as an indicator, read only memory having "ROM" as an indicator, or a computer disk) of computer 164. Controller logic 166 is preferably derived from a source language program compiled to generate the machine code. The physical memory storage is in electronic data communication with a central processing unit (CPU) of computer 164 which reads data from the physical memory, computationally modifies read data into resultant data, and writes the resultant data to the physical memory. Computer 164 also read signals from sensor 160 and effects signals to valve 162 according to the provisions of controller logic 166.

The fuel cell power systems described abve include a hydrogen storage-based system or a fuel reforming system. Thus, a skilled practitioner will recognize that the present invention has application to a variety of system which obtain fuel from diverse sources. In this regard, the manner in which the fuel is generated does not impact the present invention or its application into a fuel cell power system.

Figure 2:
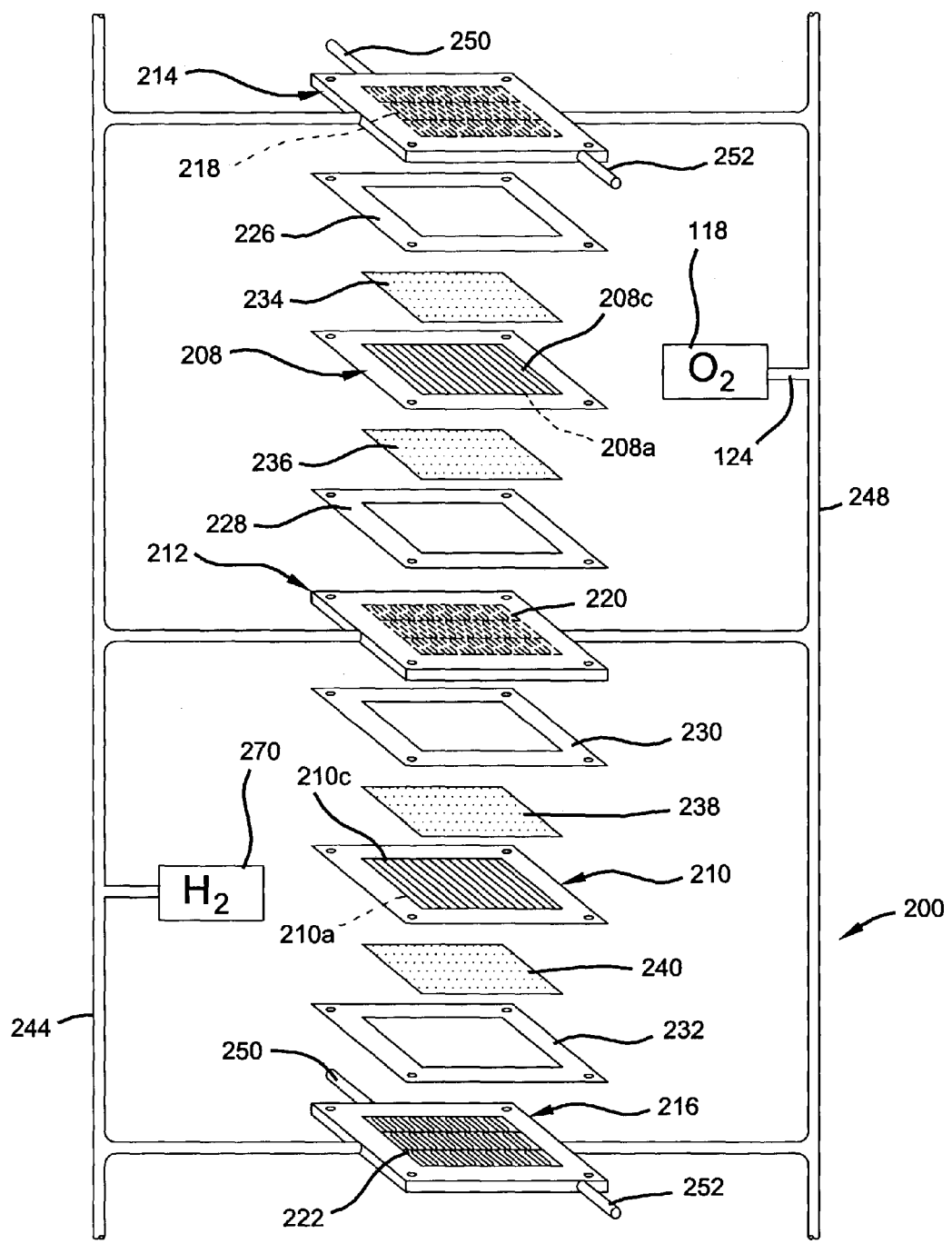
FIG. 2 shows membrane electrode assembly detail in a fuel cell stack portion.

Turning now to FIG. 2, a partial PEM fuel cell stack 200 of fuel cell stack system 122 is schematically depicted as having a pair of membrane electrode assemblies (MEAs) 208 and 210 separated from each other by a non-porous, electrically-conductive bipolar plate 212. Each of MEAs 208, 210 have a cathode face 208c, 210c and an anode face 208a, 210a. MEAs 208, 210 and bipolar plate 212 are stacked together between non-porous, electrically-conductive, liquid-cooled end plates 214 and 216. Plates 212, 214, 216 each include respective flow fields 218, 220, 222 established from a plurality of flow channels formed in the faces of the plates for distributing fuel and oxidant gases (i.e., $H_2$ & $O_2$) to the reactive faces of MEAs 208, 210. Nonconductive gaskets or seals 226, 228, 230, 232 provide sealing and electrical insulation between the several plates of fuel cell stack 200.

Porous, gas permeable, electrically conductive sheets 234, 236, 238, 240 press up against the electrode faces of MEAs 208, 210 and serve as primary current collectors for the respective electrodes. Primary current collectors 234, 236, 238, 240 also provide mechanical supports for MEAs 208, 210, especially at locations where the MEAs are otherwise unsupported in the flow field. Bipolar plate 214 presses up against primary current collector 234 on cathode face 208c of MEA 208, bipolar plate 216 presses up against primary current collector 240 on anode face 210a of MEA 210, and bipolar plate 212 presses up against primary current collector 236 on anode face 208a of MEA 208 and against primary current collector 238 on cathode face 210c of MEA 210.

An oxidant gas such as air/oxygen is supplied to the cathode side of fuel cell stack 200 from air source 118 and line 124 via appropriate supply plumbing 242. In a preferred embodiment, air is supplied to the cathode side from the ambient. A fuel such as hydrogen is supplied to the anode side of fuel cell 200 from fuel source 270 via appropriate supply plumbing 244. In a preferred embodiment, the fuel source is supplied from a reformer via line 120 after catalytically dissociating hydrogen from hydrocarbon fuel 114.

Exhaust plumbing (not shown) for both the $H_2$ and $O_2$/air sides of MEAs 208, 210 is also provided for removing anode effluent from the anode flow field and the cathode effluent from the cathode flow field. Coolant plumbing 250, 252 is provided for supplying and exhausting liquid coolant to bipolar plates 212, 214, 216, as needed.

It is to be noted that fuel cell stack 200 shows two fuel cells with plate 212 being shared between the two fuel cells and plates 214, 216 being shared between one of the shown fuel cells and, in each case, another fuel cell not depicted in FIG. 2.

Turning now to further detail in controller logic 166 of real-time computer 164 and with reference to FIG. 1, fuel cell power system 100 uses proportional flow control valve 162 to control reactant feed gas flow, and pressure sensor 160 is used as a feedback sensor measuring cathode gas pressure of fuel cell 122. A robust H-infinity controller is effected in controller logic 166 in a feedback loop between valve 162 and pressure sensor 160.

In overview, the first step of the present invention is to obtain a fundamental dynamic response model from the control loop defined from pressure sensor 160, real-time computer 164, and control valve 162. As will be described further herein, a first-order model empirically characterizes the dynamic relationship of the feedback loop between valve 162 and pressure sensor 160 in fuel cell power system 100 for the exemplary control loop and derived H-infinity robust controller. In this regard, a standard discrete time system identification technique, AutoRegressive eXogeneous or ARX, determines the first-order relationship from numerous open-loop responses of pressure 160 to step changes in control valve 162 and derives a set of models encompassing the essential full range of anticipated behavior for fuel cell power system 100. Response model uncertainties may be further determined based on the standard deviation of the models found during each response measurement.

The second step relates to development of the H-infinity data schema for the H-infinity controller. The dynamic response model with uncertainties (from the first step of the overview) is combined with various weighting data. For example, dynamic response noise "weighting" data (e.g., a noise weight matrix) derived from measurements of known high frequency EMI (electromagnetic interference) feedback noise is combined with the combined data derived from the design and measurements of the closed control loop and configured into a Linear Fractional Transformation (LFT) framework. Dynamic controller response "weighting" data (e.g. a control weight matrix) and dynamic response plant performance "weighting" data (e.g. a performance weight matrix) may be further incorporated into the LFT framework. An H-infinity data schema for an H-infinity real-time controller is then calculated from the LFT framework. Thus, the result of the first step is a dynamic response model which includes data set(s) derived from the design and measurements of the closed control loop.

Insofar as a controller derived solely from the H-infinity data schema will have an integral windup effect, a integrator compensation gain may also be effected in the H-infinity controller of controller logic 166 in real-time computer 164 to provide an integrator windup compensation block in controller logic 166, and thereby provide real-time modification of the output from real-time calculations of the H-infinity data schema to compensate for integrator windup in the control loop and maintain control valve 162 in an immediately responsive status.

Lastly, the robust control data schema and integrator windup compensator are operably incorporated in controller logic 166 of real-time computer 164 which is employed to control fuel cell power system 100.

Figure 3:
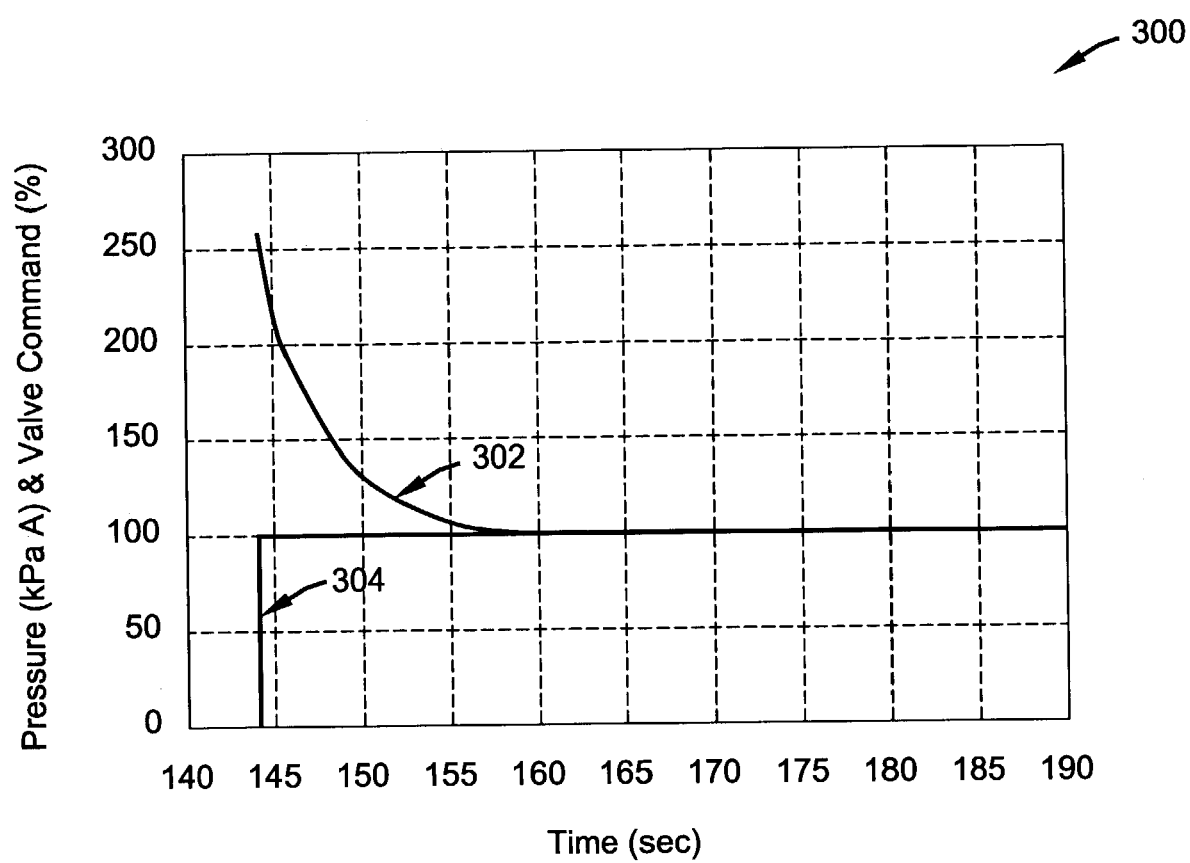
FIG. 3 shows the anode pressure due to a step response of a proportional flow control valve.
Figure 4:
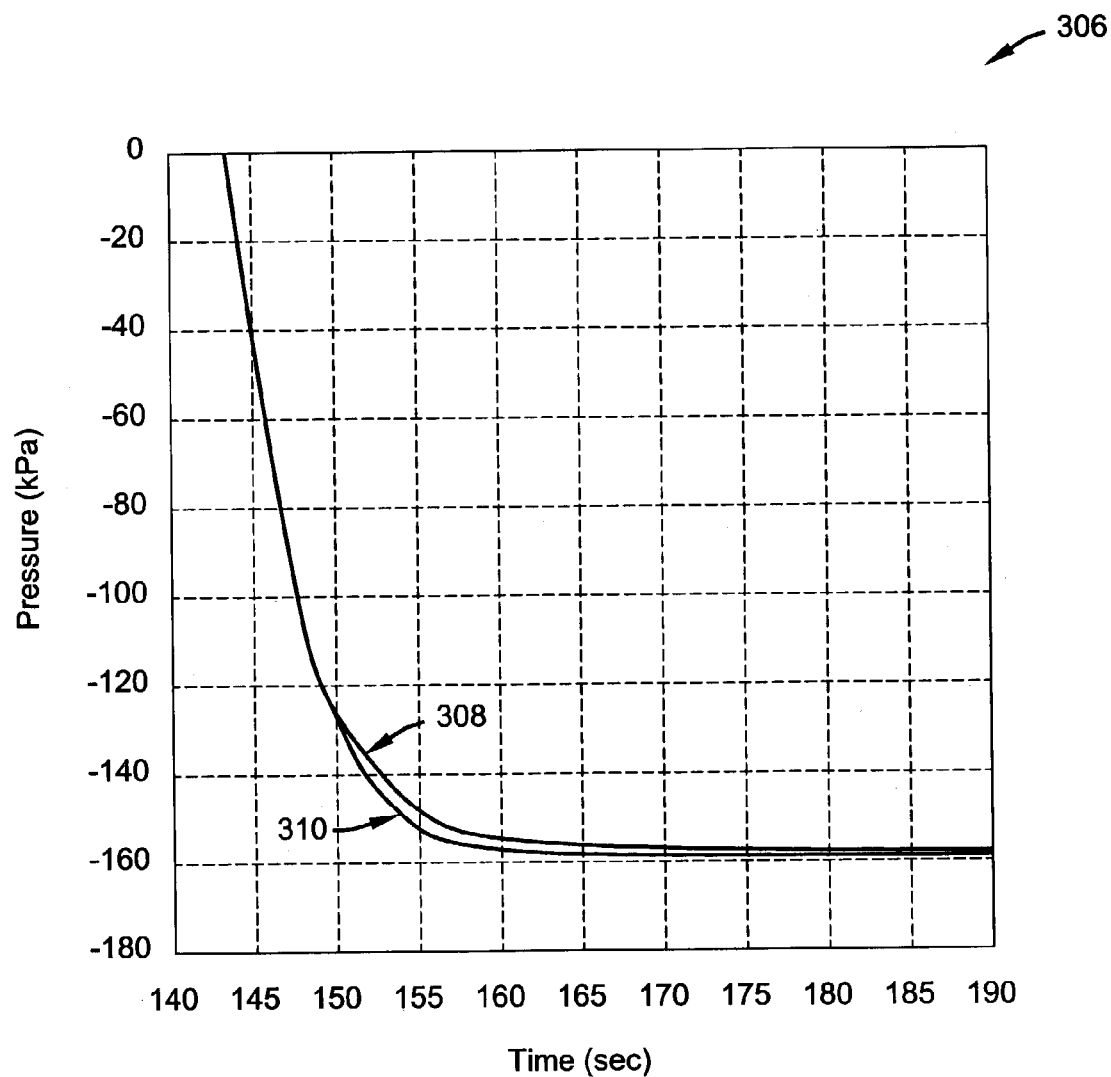
FIG. 4 shows variance between a model of the step response according to FIG. 3 and measured data.

Turning now to greater detail in implementing the steps described in the above overview, FIGS. 3 and 4 show step response 300 and empirical data and model comparison 306, respectively the curves illustrated in graphs 300, 400 may be derived (either directly of a given fuel cell or via a proximate pressure vessel physical model thereof) from the exemplary feedback loop between valve 162 and pressure sensor 160 in fuel cell power system 100 through use of a conventional system identification technique for discrete data such as AutoRegressive output with exogenous input, or ARX. Numerous textbooks have been written on this subject, a good discussion of detail is presented in "Applied System Identification" by Jer-Nan Juang (PTR Prentice Hall, 1994). As previously noted, details in the methodology of H-infinity control are established in the art and are appreciated from a study of "Essentials of Robust Control" by Kermin Zhou and John C. Doyle (Prentice Hall, 1998).

FIG. 3 shows step response 302 from step change 304 indicating position of control valve 162. This data indicates a first-order relationship for the exemplary feedback loop. A discrete time transfer function is therefore derived as:

$$\frac{y(z)}{u(z)} = \frac{\beta}{z + \alpha} \quad \text{(Eq. 1)}$$

Conversion of Equation 1 to sampled time yields:

$$y(k) = -\alpha y(k-1) + \beta u(k-1) \quad \text{(Eq. 2)}$$

Equation 2 is reformatted into matrix form with $\alpha$ and $\beta$ in Equation 2 derived from a least-squares solution technique. The further derived z-domain ARX model is:

$$\frac{\hat{P}}{ValveCmd} = \frac{-0.0371}{z - 0.9775} \quad \text{(Eq. 3)}$$

FIG. 4 shows a first-order fit 306 to normalized pressure response data for the exemplary feedback loop respective to Equation 3. Note that a 100% position for control valve 162 is a completely closed configuration for the valve. Since pressure sensor 160 has a non-zero IC, a bias of approximately -260 kPa is used to transition the ordinate of FIG. 3 to the ordinate of FIG. 4. First-order model prediction 308 as plotted against experimental data 310 is sufficiently accurate with a data minus model variance of $\sigma^2_{data-model} = 2.8084$.

In order to proceed with continuous-time robust analysis and H-infinity control data schema development, the z-domain transfer function of Equation 3 is converted to s-domain form as:

$$\frac{\hat{P}}{ValveCmd} = \frac{-0.3749}{s + 0.2273} \quad \text{(Eq. 4)}$$

The conversion to Equation 4 assumes a $1^{st}$ order transfer function, a sample rate of 10 Hz, and a zero-order hold.

The ARX modeling procedure is repeated for several step changes in valve position with Table 1 showing the model coefficients $\alpha$ and $\beta$ derived from each step change.

TABLE 1

System Identification.

| Model Order | Input | Output | Start Step Valve | Start Time sec | End Step Valve | End Time sec | Denominator alpha | Numerator beta | Error Variance |
|---|---|---|---|---|---|---|---|---|---|
| 1st | Valve | P | 0 | 13.4 | 100 | 143.5 | −0.982 | −0.0319 | 45.3855 |
| 1st | Valve | P | 100 | 143.5 | 10 | 188.1 | −0.978 | −0.0371 | 2.8084 |
| 1st | Valve | P | 10 | 188.1 | 0 | 281.3 | −0.985 | −0.0260 | 39.4215 |
| 1st | Valve | P | 0 | 281.3 | 100 | 284.8 | −0.952 | −0.0360 | 0.0319 |
| 1st | Valve | P | 100 | 284.8 | 20 | 344.9 | −0.977 | −0.0379 | 1.0573 |
| 1st | Valve | P | 20 | 344.9 | 100 | 441.2 | −0.979 | −0.0363 | 2.5137 |
| 1st | Valve | P | 100 | 441.2 | 30 | 500.6 | −0.976 | −0.0415 | 0.7038 |
| 1st | Valve | P | 30 | 500.6 | 100 | 588.3 | −0.978 | −0.0340 | 2.1465 |
| 1st | Valve | P | 100 | 588.3 | 40 | 676.7 | −0.973 | −0.0412 | 0.3709 |
| 1st | Valve | P | 40 | 676.7 | 100 | 741.3 | −0.975 | −0.0317 | 1.6924 |
| 1st | Valve | P | 100 | 741.3 | 50 | 814.4 | −0.972 | −0.0365 | 0.3134 |
| 1st | Valve | P | 50 | 814.4 | 100 | 871.6 | −0.971 | −0.0264 | 0.8339 |
| 1st | Valve | P | 100 | 871.6 | 60 | 923.9 | −0.965 | −0.0326 | 0.0914 |
| 1st | Valve | P | 60 | 923.9 | 100 | 976.6 | −0.957 | −0.0203 | 0.3657 |

TABLE 1-continued

System Identification.

| Model Order | Input | Output | Start Step Valve | Start Time sec | End Step Valve | End Time sec | Denominator alpha | Numerator beta | Error Variance |
|---|---|---|---|---|---|---|---|---|---|
| 1st | Valve | P | 100 | 976.6 | 70 | 1057.0 | −0.944 | −0.0247 | 0.0638 |
| 1st | Valve | P | 70 | 1057.0 | 100 | 1100.6 | −0.959 | −0.0130 | 0.1473 |
| 1st | Valve | P | 100 | 1100.6 | 80 | 1130.8 | −0.935 | −0.0193 | 0.0155 |
| 1st | Valve | P | 80 | 1130.8 | 0 | 1152.3 | −0.841 | −0.0149 | 0.0159 |
| 1st | Valve | P | 0 | 1152.3 | 80 | 1220.5 | −0.982 | −0.0382 | 7.1789 |
| 1st | Valve | P | 80 | 1220.5 | 20 | 1269.3 | −0.977 | −0.0482 | 0.6847 |
| 1st | Valve | P | 20 | 1269.3 | 80 | 1325.5 | −0.979 | −0.0469 | 5.0218 |
| 1st | Valve | P | 80 | 1325.5 | 40 | 1373.3 | −0.975 | −0.0552 | 0.2094 |
| 1st | Valve | P | 40 | 1373.3 | 80 | 1429.4 | −0.975 | −0.0470 | 2.0239 |
| 1st | Valve | P | 80 | 1429.4 | 60 | 1472.4 | −0.970 | −0.0568 | 0.0467 |
| 1st | Valve | P | 60 | 1472.4 | 80 | 1538.0 | −0.966 | −0.0357 | 0.2319 |
| 1st | Valve | P | 80 | 1538.0 | 100 | 1604.1 | −0.957 | −0.0449 | 0.0814 |
| | | | FULL DATA | | Nominal | | −0.9646 | −0.0352 | 4.3637 |
| | | | | | StandardDev | | 0.0274 | 0.0111 | 11.1366 |

As should be apparent, the model results are sufficiently accurate over numerous open-loop responses of pressure measurements from sensor 160 to step changes in control valve 162 for deriving a set of models which encompass the essential full range of anticipated behavior for fuel cell power system 100 with (a) further confirmation of the first-order response nature of the system over the full range of anticipated behavior and (b) a model minus data variance of less than 10 for nearly all cases. Once a set of models is found, a nominal model is derived accounting for modeling uncertainties with uncertainty parameters and one standard deviation. The nominal discrete model with the uncertainties (1σ) from Equation 4 and Table 1 is:

$$\frac{\hat{P}}{ValveCmd} = \frac{-(0.0352 \pm 0.0111)}{z - (0.9646 \pm 0.0274)} \quad \text{(Eq. 5)}$$

Converting the discrete domain model of Equation 5 to a derived continuous model yields:

$$\frac{\hat{P}}{ValveCmd} = \frac{\beta}{s + \alpha} = \frac{-(0.3569 \pm 0.1084)}{s + (0.3645 \pm 0.2882)} \quad \text{(Eq. 6)}$$

Once the dynamic response model of Equation 6 is defined, the system is formulated into a form consistent with robust analysis. This process entails (a) "pulling-out" the uncertainties in the control loop, (b) defining weight matrices, and (c) formulating the derived models and data into a Linear Fractional Transformation (LFT).

Figure 5:
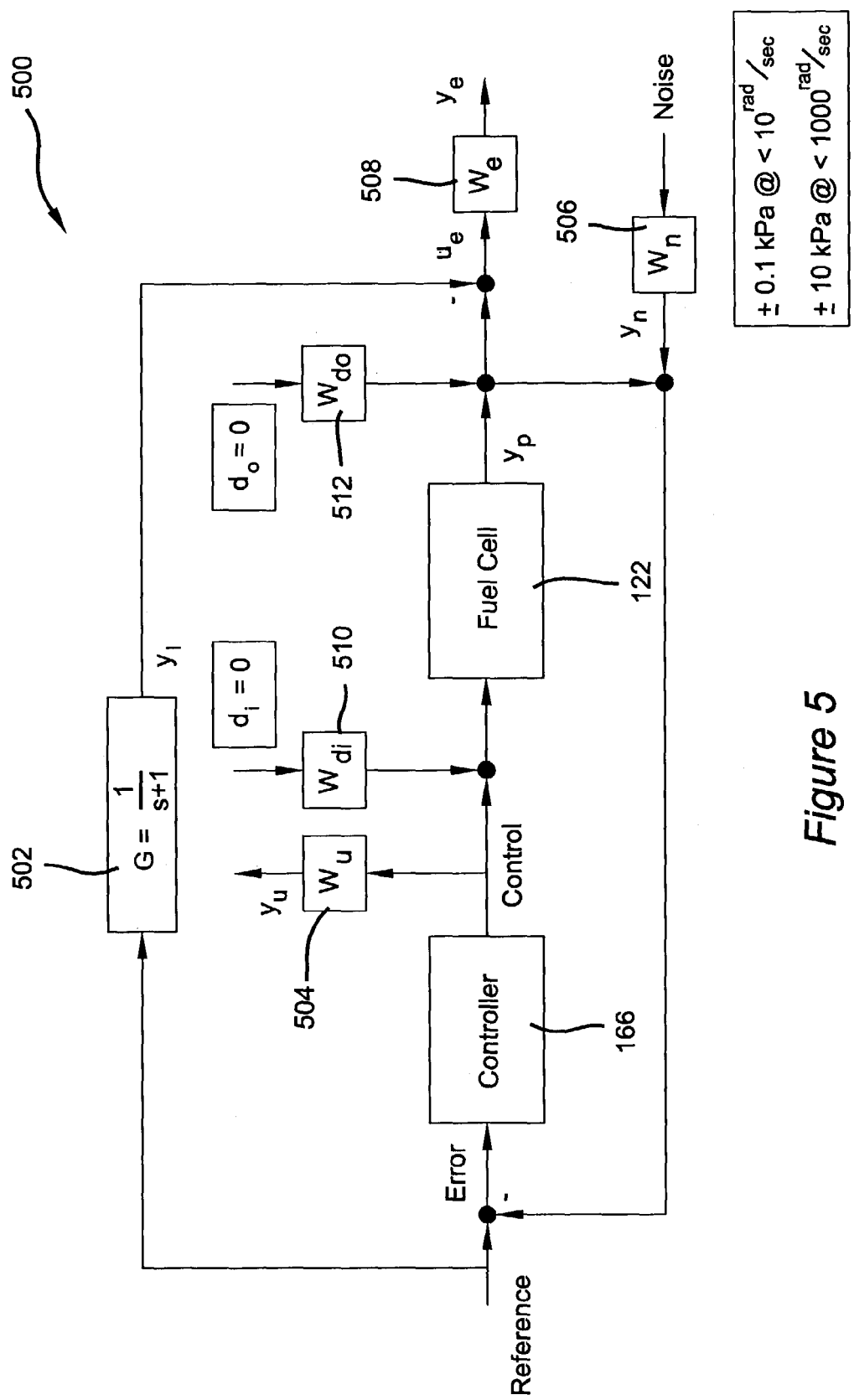
FIG. 5 shows a feedback control system model in a form consistent with robust analysis.

FIG. 5 shows feedback control system model 500 for the pressure control system in fuel cell 122 in a form consistent with robust analysis. Model block 502, control weight matrix 504 ($W_u$), sensor noise weight matrix 506 ($W_n$), performance weight matrix 508 ($W_e$), system disturbance boundary 512 ($W_{do}$), system disturbance boundary 510 ($W_{di}$), and Controller 166 (as converted to physical flow via control valve 162) all interrelate as shown to feed fuel (hydrogen) and affect cathode pressure control within fuel cell 122.

Figure 6:
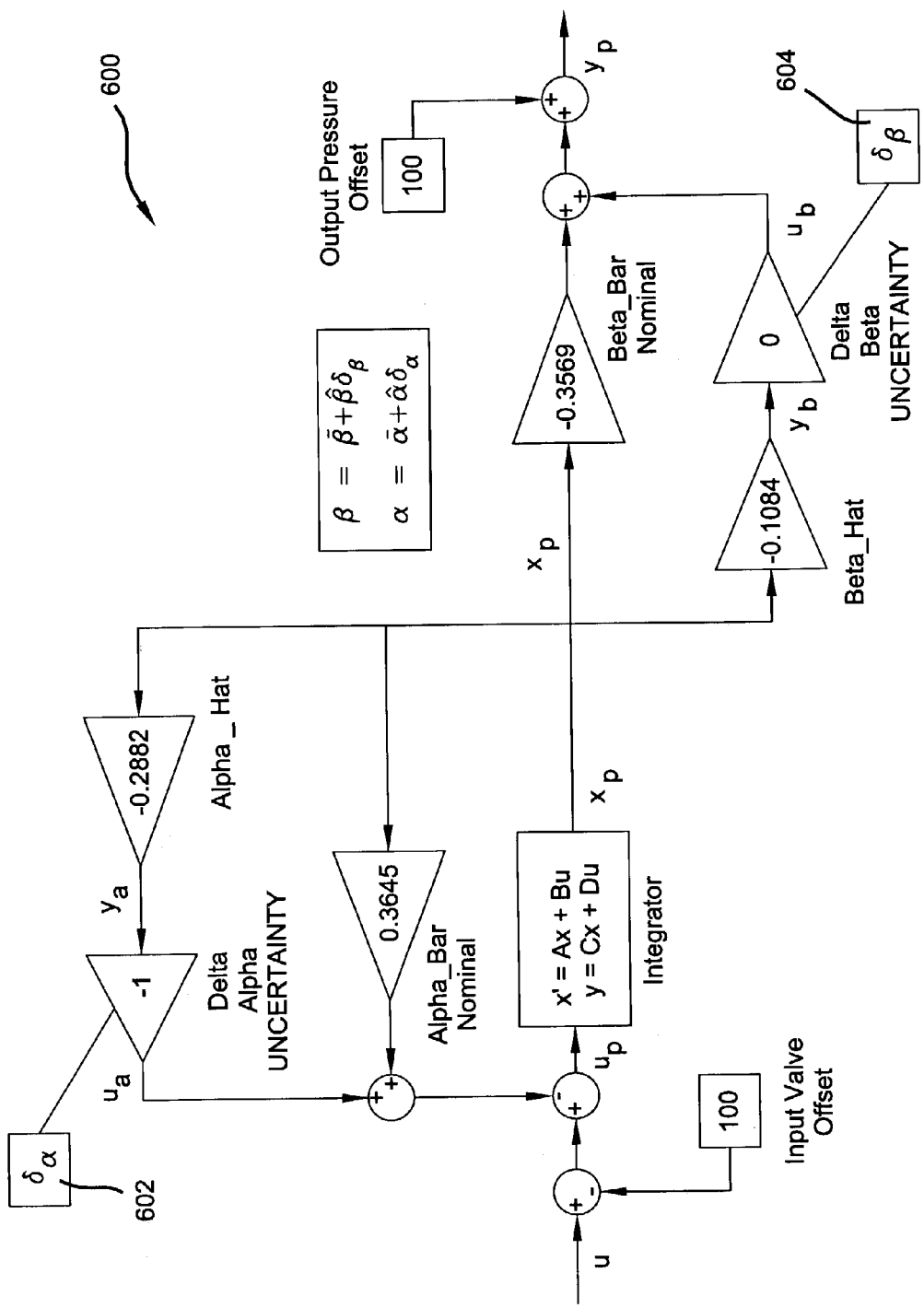
FIG. 6 depicts a patterned schema showing management of uncertainties in a control loop model.

Turning now to FIG. 6, the uncertainties in the control loop are "pulled out" according to patterned schema 600. With reference to Equation 6, FIG. 6 illustrates how the uncertainties in the dynamic response model are removed from the nominal feedback loop. The considerations summarized by FIG. 6 allow the amount of uncertainty in the feedback loop to be determined by $\delta_\alpha$ at model block 602 and $\delta_\beta$ at model block 604. These parameters are allowed to take a form between ±1. A consideration of FIG. 6 indicates that if $\delta_\alpha$ and $\delta_\beta$ are set to zero, a nominal feedback loop results. The offsets are derived from normalizing the initial conditions to zero for the ARX model.

After uncertainties in the control loop have been "pulled out", weight matrices to provide "weighting" in the real-time computations of controller logic 166 are defined. Three weight matrices are used in the exemplary feedback loop to address three different issues—controller output, noise input, and plant performance output. These matrices are identified in FIG. 5 as control weight matrix 504 ($W_u$), sensor noise weight matrix 506 ($W_n$), and performance weight matrix 508 ($W_e$).

Control weight matrix 504 ($W_u$) is derived from:

$$W_u = \frac{s + 0.1}{0.1s + 10} \quad \text{(Eq. 7)}$$

Figure 7:
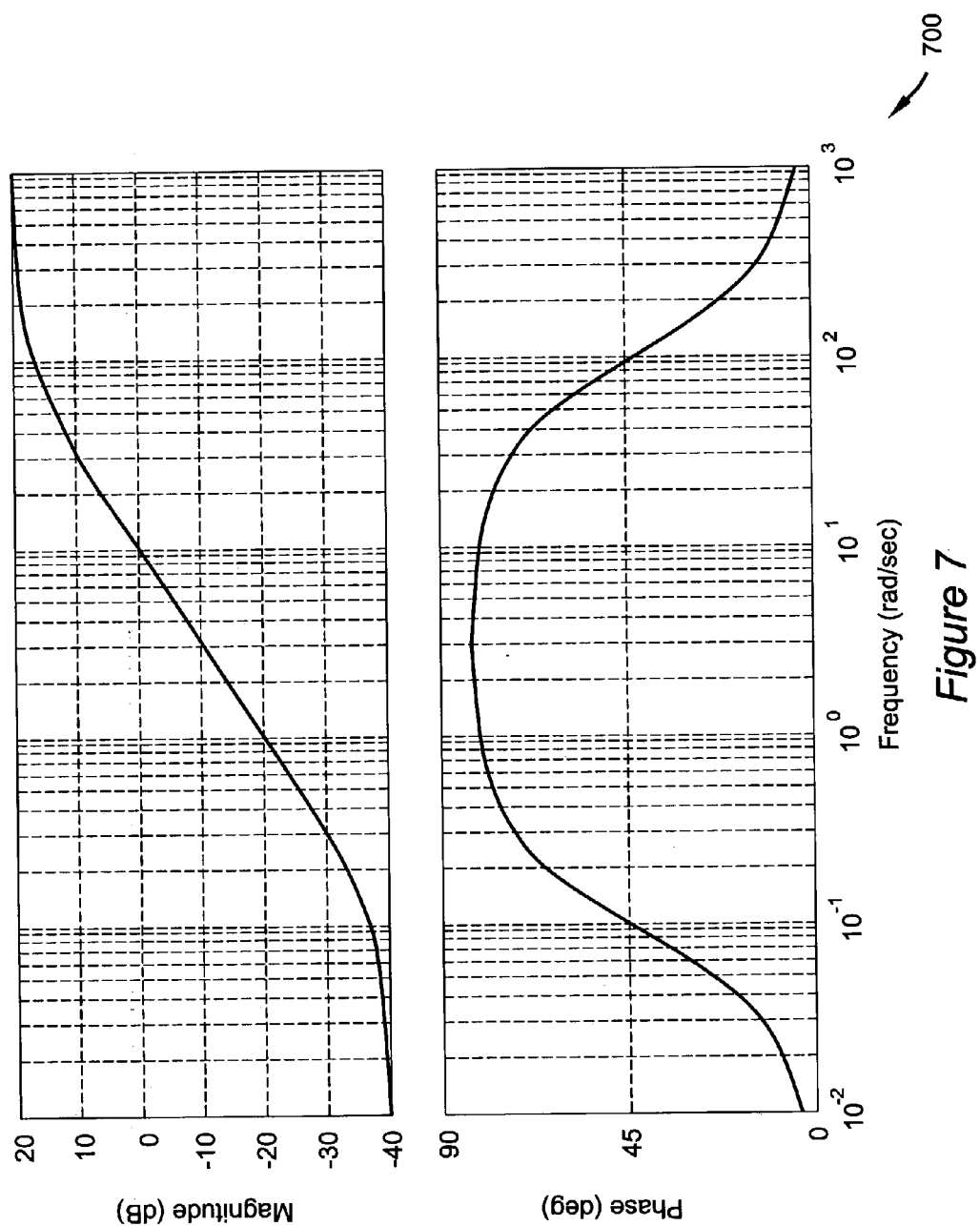
FIG. 7 provides a frequency response profile plot of a transfer function related to a control weight matrix.

The control weight matrix, $W_u$, is defined to provide full performance at low frequencies (<0.1 rad/sec) but reduced performance at higher frequencies (>100 rad/sec). FIG. 7 provides a frequency response profile plot 700 of the transfer function in Equation 7.

Sensor noise weight matrix 506 ($W_n$) is derived from:

$$W_n = \frac{10(s + 10)}{s + 1000} \quad \text{(Eq. 8)}$$

Figure 8:
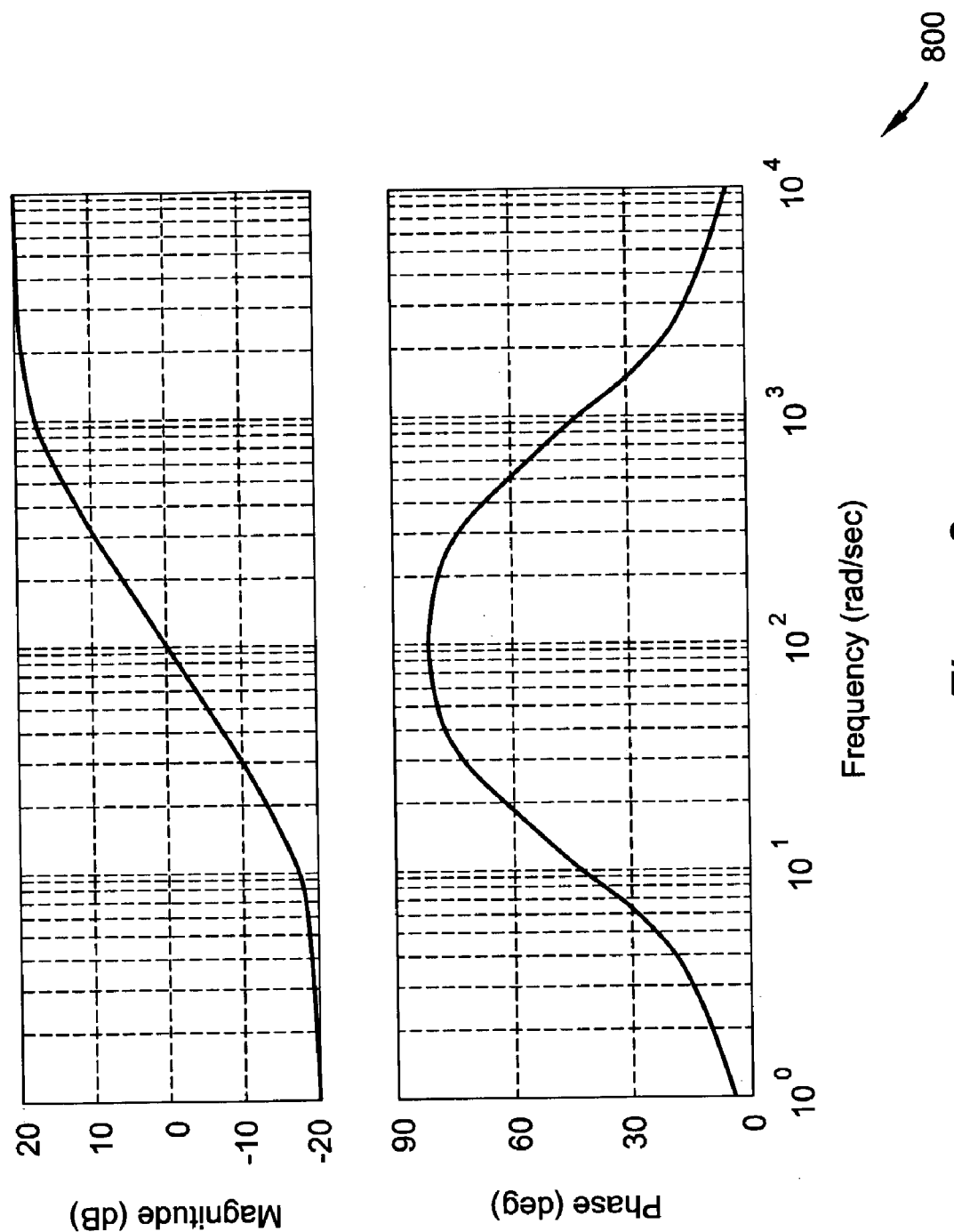
FIG. 8 provides a frequency response profile plot of a transfer function related to a sensor noise weight matrix.

Sensor noise weight matrix ($W_n$) is defined to provide an essentially low amount of corruption from low frequency (<10 rad/sec) noise with a transition to increased corruption at higher frequencies (>1000 rad/sec). In this regard, pressure sensor 160 is highly susceptible to high frequency EMI noise. FIG. 8 provides a frequency response profile plot 800 of the transfer function in Equation 8. Note that, at frequencies greater than 1000 rad/sec, the signal from pressure sensor 160 is highly corrupted by as much as +/−10 kPa.

Performance noise weight matrix 508 ($W_e$) is derived from:

$$W_e = \frac{s + 0.8}{0.08s + 0.0008} \quad \text{(Eq. 9)}$$

Figure 9:
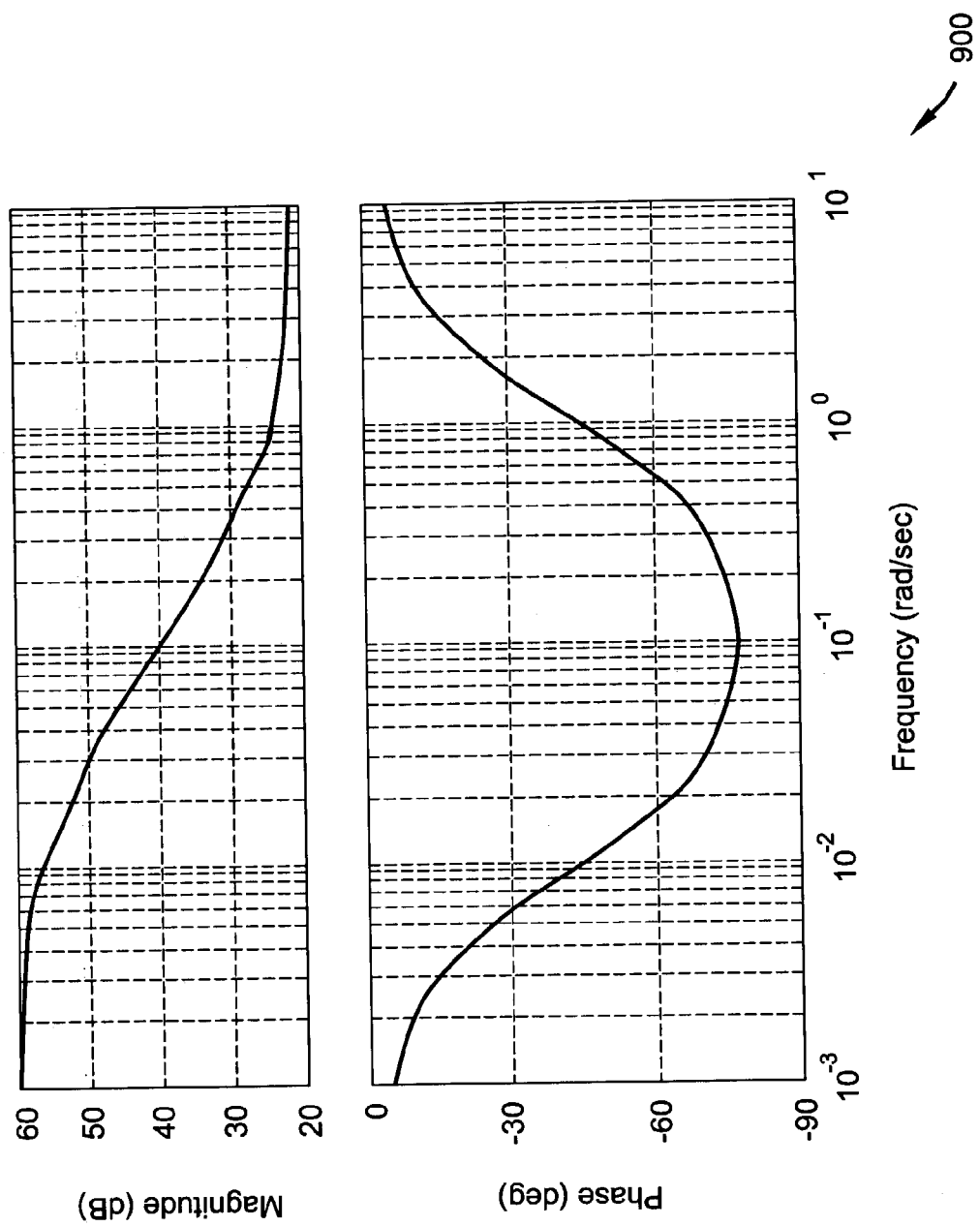
FIG. 9 provides a frequency response profile plot of a transfer function related to a performance weight matrix.

Performance weight matrix 508 ($W_e$) is defined to provide an essentially ideal dynamic response model at near steady-state (<0.1 rad/sec) with a transition to a more substantial deviation from the ideal response model at higher frequencies. As will be apparent from the basis of the modeling, the ideal plant is chosen as a simple first order system per model block 502. FIG. 9 provides a frequency response profile plot 900 of the transfer function in Equation 9.

Figure 10:
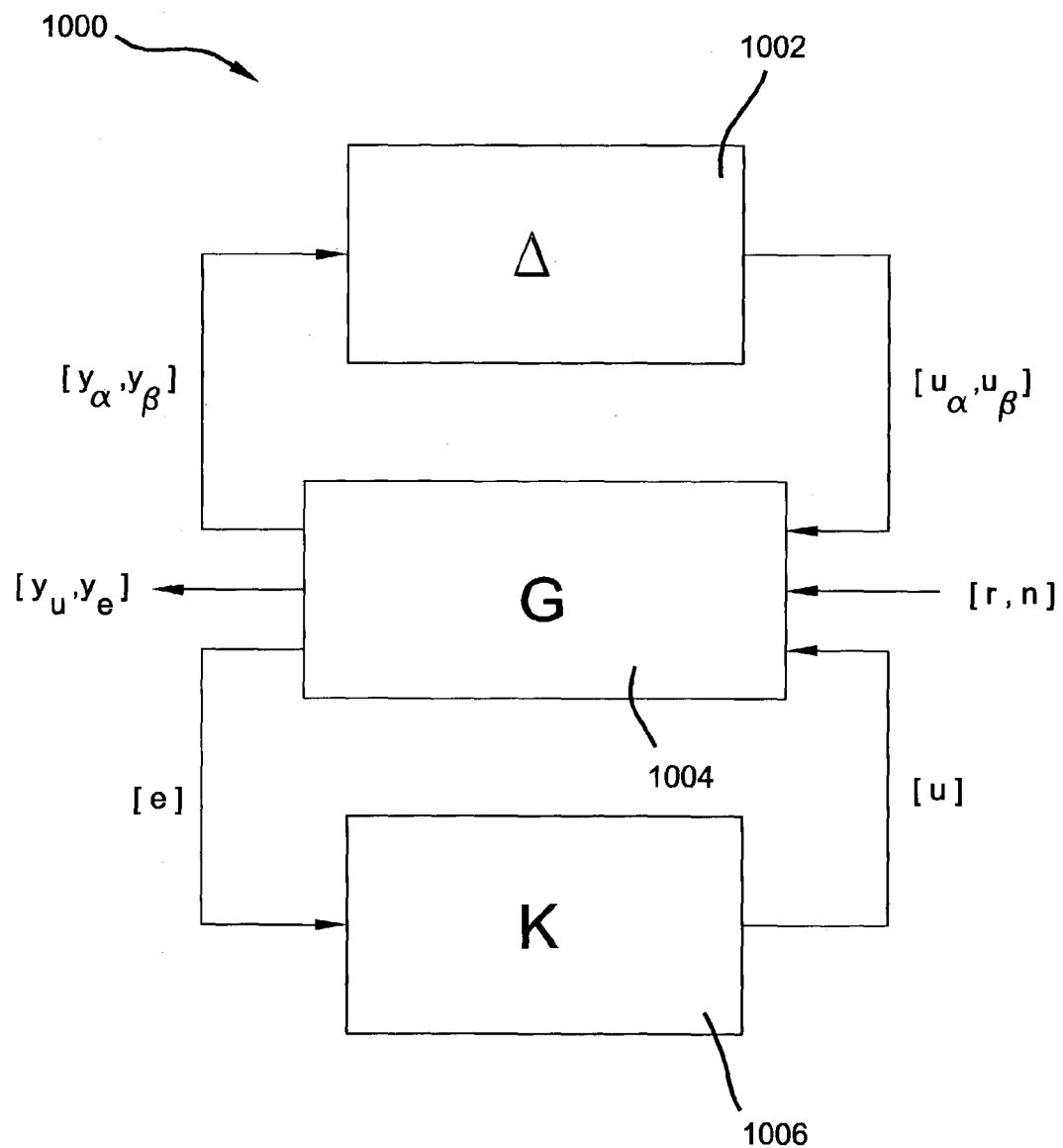
FIG. 10 shows an exemplary feedback loop in overall linear fractional transformation form.

After "pulling-out" of the uncertainties in the control loop and definition of weight matrices has been achieved, the derived models and data are formulated into a Linear Fractional Transformation (LFT). The exemplary feedback loop is shown in overall LFT form 1000 in FIG. 10. Difference block 1002, model block 1004, and controller block 1006 all interrelate as shown in LFT form 1000.

In the context of FIG. 5 and through use of control weight matrix 504 ($W_u$), sensor noise weight matrix 506 ($W_n$), and performance weight matrix 508 ($W_e$), the following series of equations and the relationship illustrated in FIG. 11 formalize the exemplary closed-loop control system of this specification into LFT form. FIG. 11 shows LFT matrix 1100 having quadrants A, B, C, and D respectively designating domains relative to companion variables with the same A, B, C, and D primary symbols in Equations 11, 12, 13, 14, 20, and 21.

$$e = r - y_p - y_n \quad \text{(Eq. 10)}$$

$$\dot{x}_n = A_n x_n + B_n n \quad \text{(Eq. 11)}$$

$$y_n = C_n x_n + D_n n \quad \text{(Eq. 12)}$$

$$\dot{x}_u = A_u x_u + B_u u \quad \text{(Eq. 13)}$$

$$y_u = C_u x_u + D_u u \quad \text{(Eq. 14)}$$

$$\dot{x}_p = u_p \quad \text{(Eq. 15)}$$

$$u_p = u - 100 - \bar{\alpha} x_p - u_\alpha \quad \text{(Eq. 16)}$$

$$y_p = \bar{\beta} x_p + u_\beta + 100 \quad \text{(Eq. 17)}$$

$$y_\alpha = \hat{\alpha} x_p \quad \text{(Eq. 18)}$$

$$y_\beta = \hat{\beta} x_p \quad \text{(Eq. 19)}$$

$$\dot{x}_e = A_e x_e + B_e e \quad \text{(Eq. 20)}$$

$$y_e = C_e x_e + D_e e \quad \text{(Eq. 21)}$$

$$[y_\alpha y_\beta y_u y_e]^T = G[u_\alpha u_\beta 1 r n u] \quad \text{(Eq. 22)}$$

As should be apparent from the steps leading to the above-described LFT formalization, concerns related to uncertainty in operation of fuel cell 122, sensor 160 noise, and responsiveness at different states of operation are effectively incorporated into the LFT formalization.

Once the system is in LFT form, an H-infinity control data schema is derived. In this regard, the MATLAB μ-analysis toolbox add-on available from The Mathworks, Inc. of Natick, Mass. is convenient for solving the LFT and Algebraic Riccati Equation to calculate a robust controller. For the exemplary control loop, the resulting control statement for the H-infinity control data schema is $$K = \frac{1.6814 s^3 - 1854 s^2 - 169550 s - 87308}{s^4 + 1007 s^3 + 12578 s^2 + 77073 s + 2.1017} \quad \text{(Eq. 23)}$$

In order to analyze robust stability and nominal performance in a simulator, controller K is incorporated into G to yield $$G_p = GK \quad \text{(Eq. 24)}$$

Wherein:

$$\begin{bmatrix} y_\alpha \\ y_\beta \\ y_u \\ y_e \end{bmatrix} = G_p \begin{bmatrix} u_\alpha \\ u_\beta \\ 1 \\ r \\ n \end{bmatrix} = \begin{bmatrix} G_{p11} & G_{p12} \\ G_{p21} & P_{p22} \end{bmatrix} \begin{bmatrix} u_\alpha \\ u_\beta \\ 1 \\ r \\ n \end{bmatrix} \quad \text{(Eq. 25)}$$

As will further be appreciated by those of skill, robust stability, nominal performance, and μ-analysis are recommended for application to the designed robust controller. Simulated results of robust controller use should also be considered for analysis to observe the performance of the control data schema.

Figure 12:
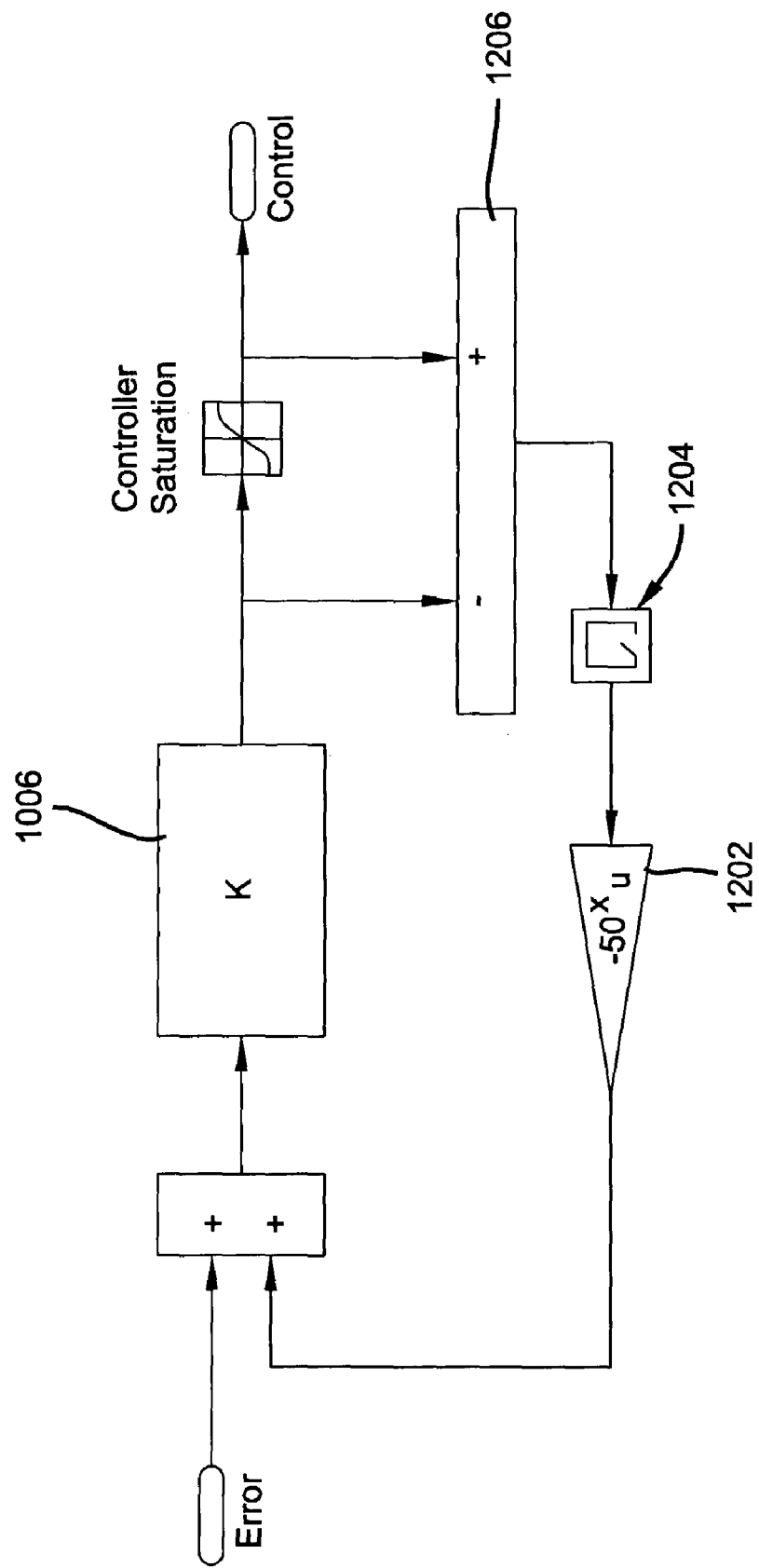
FIG. 12 shows detail in an H-infinity controller with an integrator windup compensation block.

Turning now to FIG. 12 (showing further detail in the H-infinity controller), integrator windup compensation block 1202 in controller logic 166 (illustrated in FIG. 1) is included to "stall" output from H-infinity data schema 1006 (including controller K of Equation 11) in cases where controller saturation occurs during real-time execution of schema 1006 by real-time computer 164. In this regard, a controller derived solely from the H-infinity data schema may have an integral windup effect. Integrator windup compensation block 1202 effects real-time modification of the output from real-time calculations of H-infinity data schema 1006 to compensate for integrator windup in the control loop and maintain control valve 162 in an immediately responsive status. In this regard, controller saturation influence is input via block 1206 into memory section 1204 in computer 164. Memory section 1204 inputs a value to integrator windup compensation block 1202 so that integrator windup compensation block 1202 outputs a modifying value for H-infinity data schema 1006.

A number of benefits are derived from the use of H-infinity controller in a fuel cell power system in accordance with the present invention. These are appreciated in general comparison to a PID (proportional-integral-derivative) controller. The robust control approach of the described H-infinity controller provides superior performance in the presence of high frequency feedback noise (e.g., without limitation, +/−10 kPa high frequency EMI) when compared to a standard PID controller. Since a PID control signal will vary more dramatically than the control signal from an H-infinity controller, a significantly improved operation of control valve 162 accrues from the use of the H-infinity controller. A PID control strategy also requires retuning of its affiliated gains in the event of a change in system dynamics; this is not needed with the H-infinity controller. Morever, part-to-part actuator variation is also less in the H-infinity controller case.

In the described H-infinity controller, fuel cell uncertainties are directly incorporated into the problem formulation.

In this regard, a primary problem in control development is that modeled systems that change over time frequently render an original dynamic response model unacceptable for control over the long term which is diminished by use of H-infinity control.

Signal noise is also incorporated into the formulation of the described H-infinity controller. In this regard, signal corruption is typically quantified according to its frequency response. Filtering of these frequencies is applied to the control data schema in the H-infinity controller. This enables deployment of low cost sensors and valves with a saving to overall system cost. Because the H-infinity controller has a high tolerance to EMI, wiring and packaging needs are also minimized respective to EMI shielding.

The description of the invention is merely exemplary in nature and, thus, variations that do not depart from the gist of the invention are intended to be within the scope of the invention. For example, the preferred embodiment has been described in reference to measuring the pressure of the cathode exhaust stream and controlling the anode feed stream. However, one skilled in the art will appreciate that the location of the pressure measurement may be varied. Likewise, the sides of the fuel cell for measurement (cathode side) and control (anode side) may be interchanged. Such variations are not to be regarded as a departure from the spirit and scope of the invention.

What is claimed is:

1. A fuel cell system comprising:
   a fuel cell with at least one membrane electrode assembly in reactive interface with an oxidant reactant on one face thereof and a fuel reactant on another face thereof;
   a valve interposed between an oxidant source and said fuel cell to control the flow rate of one of said oxidant and said fuel reactant;
   a pressure sensor operable to measure pressure of the other of said oxidant and said fuel reactant; and
   an H-infinity controller coupled in a feedback loop between said valve and said pressure sensor.

2. The fuel cell of claim 1 wherein said pressure sensor measures the pressure of said oxidant reactant and said valve controls the flow rate of said fuel reactant.

3. The fuel cell of claim 1 further comprising an integrator windup compensator in data communication with said H-infinity controller.

4. The fuel cell of claim 3 further comprising a real-time computer wherein said H-infinity controller and said integrator windup compensator are executed in said real-time computer.

5. The fuel cell of claim 1 wherein said H-infinity controller incorporates a control weight matrix ($W_u$) to provide full performance below a first predetermined frequency and reduced performance above a second predetermined frequency.

6. The fuel cell of claim 5 wherein said $W_u$ is derived from a control weight matrix transfer function $$\left(W_u = \frac{s + 0.1}{0.1s + 10}\right)$$

wherein s equals a complex frequency.

7. The fuel cell of claim 5 wherein said H-infinity controller incorporates said $W_u$ according to a response profile of a control weight matrix transfer function $$\left(W_u = \frac{s + 0.1}{0.1s + 10}\right)$$

wherein s equals a complex frequency.

8. The fuel cell of claim 1 wherein said H-infinity controller incorporates a sensor noise weight matrix ($W_n$) to compensate for corruption above a first predetermined frequency.

9. The fuel cell of claim 8 wherein said $W_n$ is derived from a sensor noise weight matrix transfer function $$\left(W_n = \frac{10(s + 10)}{s + 1000}\right)$$

wherein s equals a complex frequency.

10. The fuel cell of claim 8 wherein said H-infinity controller incorporates said $W_n$ according to a response profile of a sensor noise weight matrix transfer function $$\left(W_n = \frac{10(s + 10)}{s + 1000}\right)$$

wherein s equals a complex frequency.

11. The fuel cell of claim 1 wherein said H-infinity controller incorporates a performance weight matrix ($W_e$) to compensate for deviation from a steady-state response model above a first predetermined frequency.

12. The fuel cell of claim 11 wherein said $W_e$ is derived from a performance weight matrix transfer function $$\left(W_e = \frac{s + 0.8}{0.08s + 0.0008}\right)$$

wherein s equals a complex frequency.

13. The fuel cell of claim 11 wherein said H-infinity controller incorporates $W_e$ according to a response profile of a performance weight matrix transfer function $$\left(W_e = \frac{s + 0.8}{0.08s + 0.0008}\right)$$

wherein s equals a complex frequency.

14. The fuel cell of claim 1 wherein said H-infinity controller incorporates a control weight matrix ($w_u$) according to a response profile of a control weight matrix transfer function $$\left(W_u = \frac{s + 0.1}{0.1s + 10}\right),$$

a sensor noise weight matrix ($W_n$) according to a response profile of a sensor noise weight matrix transfer function $$\left(W_n = \frac{10(s+10)}{s+1000}\right),$$

and a performance weight matrix ($W_e$) according to a response profile of a performance weight matrix transfer function $$\left(W_e = \frac{s+0.8}{0.08s+0.0008}\right),$$

wherein s equals a complex frequency.

15. A method for operating a fuel cell system of the type having a fuel cell with at least one membrane electrode assembly in reactive interface with an oxidant reactant on one face thereof and a fuel reactant on another face thereof, said method comprising:
measuring pressure data of one of said oxidant and said fuel reactant;
deriving a setpoint for a flow rate of the other of said oxidant and said fuel reactor from an H-infinity control model as a function of said pressure data; and
regulating said flow rate based on said setpoint.

16. The method of claim 15 wherein measuring pressure data measures the pressure of said oxidant reactant, and a setpoint for said flow rate of said fuel reactant is derived from said oxidant reactant pressure data.

17. The method of claim 15 further comprising the step of compensating for integrator windup in said H-infinity control model.

18. The method of claim 17 wherein deriving a setpoint and compensating for integrator windup is provided in approximately real time.

19. The method of claim 15 wherein deriving a setup includes providing full performance below a first predetermined frequency and reduced performance above a second predetermined frequency.

20. The method of claim 19 wherein a control weight matrix is derived from a control weight matrix transfer function $$\left(W_u = \frac{s+0.1}{0.1s+10}\right)$$

wherein s equals a complex frequency.

21. The method of claim 19 wherein said H-infinity controller incorporates a control weight matrix according to a response profile of a control weight matrix transfer function $$\left(W_u = \frac{s+0.1}{0.1s+10}\right)$$

wherein s equals a complex frequency.

22. The method of claim 15 wherein deriving a setpoint includes compensating for noise corruption above a predetermined frequency.

23. The method of claim 22 wherein a sensor noise weight matrix is derived from a sensor noise weight matrix transfer function $$\left(W_n = \frac{10(s+10)}{s+1000}\right)$$

wherein s equals a complex frequency.

24. The method of claim 22 wherein said H-infinity controller incorporates a sensor noise weight matrix according to a response profile of a sensor noise weight matrix transfer function $$\left(W_n = \frac{10(s+10)}{s+1000}\right)$$

wherein s equals a complex frequency.

25. The method of claim 15 wherein deriving a setpoint includes compensating for deviation from a steady-state model above a predetermined frequency.

26. The method of claim 25 wherein a performance weight matrix is derived from a performance weight matrix transfer function $$\left(W_e = \frac{s+0.8}{0.08s+0.0008}\right)$$

wherein s equals a complex frequency.

27. The method of claim 25 wherein said H-infinity controller incorporates a performance weight matrix according to a response profile of a performance weight matrix transfer function $$\left(W_e = \frac{s+0.8}{0.08s+0.0008}\right)$$

wherein s equals a complex frequency.

28. The method of claim 15 wherein said H-infinity control model incorporates a control weight matrix according to a response profile of a control weight matrix transfer function $$\left(W_u = \frac{s+0.1}{0.1s+10}\right),$$

a sensor noise weight matrix according to a response profile of a sensor noise weight matrix transfer function $$\left(W_n = \frac{10(s+10)}{s+1000}\right),$$

and a performance weight matrix according to a response profile of a performance weight matrix transfer function $$\left(W_e = \frac{s+0.8}{0.08s+0.0008}\right),$$

wherein s equals a complex frequency.

* * * * *